(12) United States Patent
Galambos et al.

(10) Patent No.: US 7,755,698 B2
(45) Date of Patent: Jul. 13, 2010

(54) SYSTEMS AND METHODS FOR DYNAMIC CURRENT SCALING OF ANALOG FUNCTIONS IN AN IMAGER

(75) Inventors: Tiberiu C. Galambos, Biniamina (IL); Yair Elmakias, Givat Olga (IL); Nadav Melamud, Kfar Malal (IL)

(73) Assignee: Samsung Electronics, Co., Ltd., Gyeonggi-do (KR)

( * ) Notice: Subject to any disclaimer, the term of this patent is extended or adjusted under 35 U.S.C. 154(b) by 1471 days.

(21) Appl. No.: 11/073,414

(22) Filed: Mar. 3, 2005

(65) Prior Publication Data

US 2005/0195320 A1 Sep. 8, 2005

Related U.S. Application Data

(60) Provisional application No. 60/549,955, filed on Mar. 3, 2004.

(51) Int. Cl.
*H04N 5/225* (2006.01)
*H04N 5/228* (2006.01)
(52) U.S. Cl. ............... 348/372; 348/207.99; 348/222.1
(58) Field of Classification Search ............... 348/372, 348/207.99, 222.1, 333.13
See application file for complete search history.

(56) References Cited

U.S. PATENT DOCUMENTS

| | | | | |
|---|---|---|---|---|
| 5,691,720 A | * | 11/1997 | Wang et al. ............... 341/143 |
| 6,137,533 A | * | 10/2000 | Azim ....................... 348/222.1 |
| 6,233,016 B1 | * | 5/2001 | Anderson et al. ........... 348/372 |
| 6,661,457 B1 | * | 12/2003 | Mathur et al. ............... 348/273 |
| 6,850,270 B1 | * | 2/2005 | Suzuki ..................... 348/207.2 |
| 7,005,628 B2 | * | 2/2006 | Rossi ..................... 250/214 A |
| 7,030,378 B2 | * | 4/2006 | Allen et al. ................. 250/332 |
| 7,042,499 B1 | * | 5/2006 | Kido et al. ............. 348/211.14 |
| 7,123,155 B2 | * | 10/2006 | Schinner .................. 340/636.1 |
| 7,339,616 B2 | * | 3/2008 | Mabuchi et al. .......... 348/220.1 |
| 7,415,088 B2 | * | 8/2008 | Peluso et al. ................. 375/355 |
| 7,486,333 B2 | * | 2/2009 | Kawakami .................. 348/372 |
| 2003/0026614 A1 | * | 2/2003 | Watanabe et al. ........... 396/429 |

* cited by examiner

*Primary Examiner*—Ngoc-Yen T Vu
(74) *Attorney, Agent, or Firm*—Harness, Dickey & Pierce, P.L.C.

(57) ABSTRACT

According to the invention, a system for dynamically scaling bias current on an imaging system is disclosed. In the invention an image sensor capable of producing at least a two-dimensional image and capable of at least two modes of operation is equipped with a control unit. The control unit determines a digital output for each of the modes of operation of the imaging system and outputs the digital outputs to a converter. The converter converts the digital output from the control unit to a bias current and provides this output to an analog and or mixed signal circuit associated with the imaging system that has operating characteristics that may be varied by the application of different bias currents.

28 Claims, 3 Drawing Sheets

SYSTEMS AND METHODS FOR DYNAMIC CURRENT SCALING OF ANALOG FUNCTIONS IN AN IMAGER

This application claims the benefit of and is a non-provisional of U.S. Application Ser. No. 60/549,955 filed on Mar. 3, 2004, which is incorporated by reference in its entirety for all purposes.

BACKGROUND OF THE DISCLOSURE

This disclosure relates in general to reducing power consumption associated with portable devices and, more specifically, but not by way of limitation, to reducing power consumption of analog and/or mixed signal circuits associated with imaging systems.

The advent of portable electronic devices such as personal digital assistants ("PDAs"), wireless telephones, camera phones, digital cameras and camcorders, and the like, has brought about a need to limit power consumption by the portable devices so as-to increase battery life. Techniques, such as Dynamic Voltage Scaling ("DVS"), have been developed to reduce power consumption of digital circuits in portable electronic devices. However, DVS does not address power consumption by analog or mixed signal circuits. Therefore, because of the desirableness of reducing power consumption, there is a need in the art for methods and systems of reducing power consumption by analog and mixed signal circuits in portable electronic devices.

In 2004 almost 10 million camera equipped wireless phones were sold in the United States. And it is expected that as many as 28 million camera equipped wireless phones may be sold in 2005. Further, it is reported that worldwide sales of camera phones will exceed 100 million units in 2005. Reducing power consumption by the image sensor systems (cameras) in the camera phones is highly desirable to reduce power consumption and, as a result, increase battery life of camera phones to make them more attractive to consumers.

BRIEF DESCRIPTION OF THE DRAWINGS

The present disclosure is described in conjunction with the appended figures.

Figure 1:
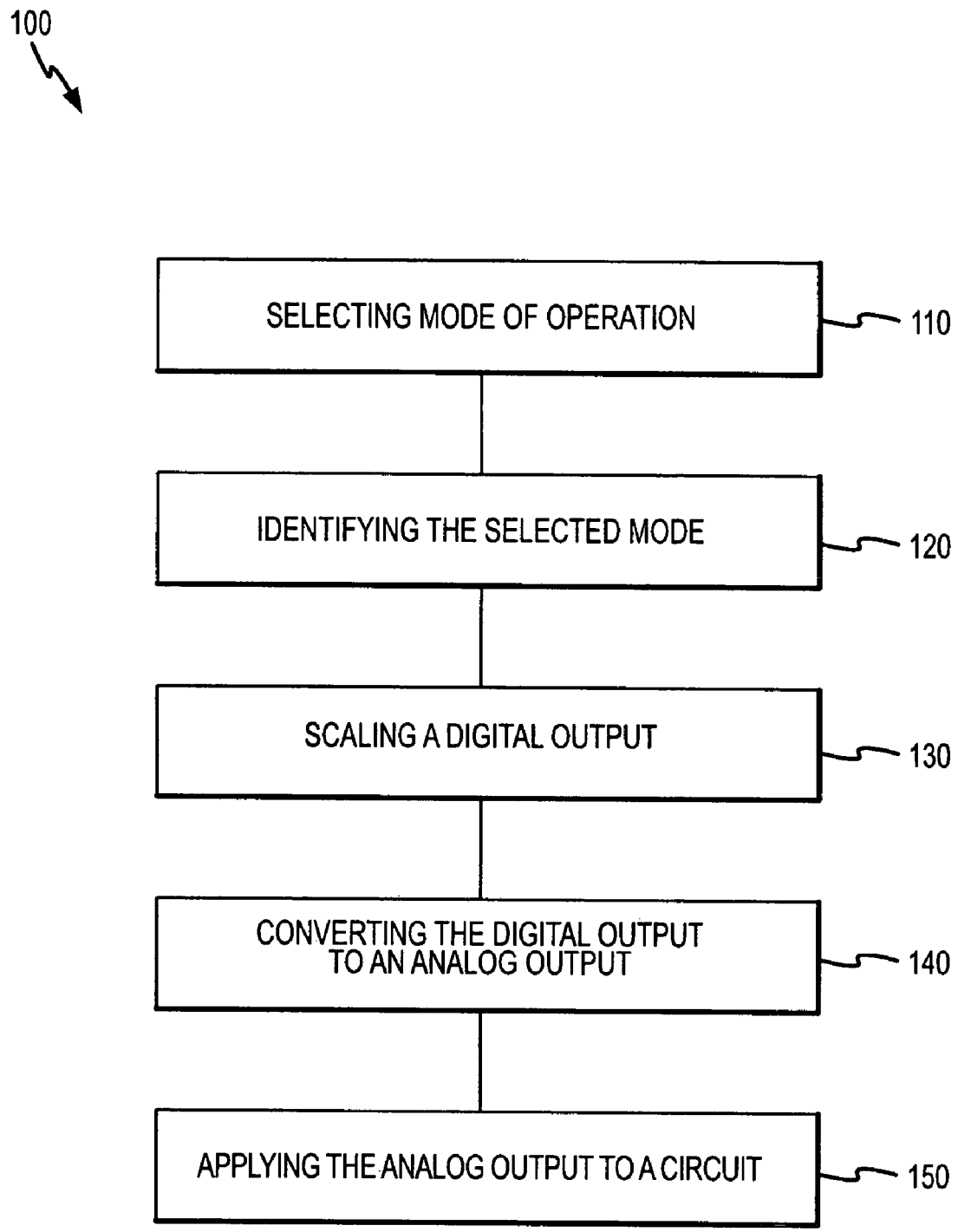
FIG. 1 is a flow diagram depicting an embodiment of a method of dynamically scaling bias current for analog and/or mixed signal circuits in an image sensor device.

In the appended figures, similar components and/or features may have the same reference label.

DETAILED DESCRIPTION OF THE INVENTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Certain embodiments of the present invention provide methods and systems for dynamically scaling bias currents applied to analog and/or mixed signal circuits in response to changes in the required characteristics of the analog and/or mixed signal circuits. More specifically, but not by way of limitation, embodiments of the present invention relate in general to methods and systems for scaling bias currents for analog and/or mixed signal circuits in an image sensor device in response to changes in the mode of operation of the image sensor device.

Certain embodiments of the present invention may provide systems and methods for dynamic scaling bias currents that may be applied to analog and/or mixed signal circuits in image sensor devices. For purposes of this application, dynamic scaling of bias currents applied to analog or mixed signal circuits is described with reference to an image sensor device. However, the systems and methods for dynamic bias current scaling disclosed in this application may be applied to many other devices incorporating analog and/or mixed signal circuits, such as wireless phones, PDAs, camcorders, mobile media devices, and the like. The term "image sensing device" may apply to any electronic device capable of producing, at least, a two-dimensional image, such as a camera phone, digital camera, digital video camera, a scanner, and the like.

Scaling of the bias current applied to analog and/or mixed signal circuits in response to changes in the desired operation of the image sensing device may provide for reduction in the consumption of power by the image sensor device. In certain embodiments of the present invention, bias currents applied to analog and/or mixed signal circuits may be reduced when the analog and/or mixed signal circuit is operating at a frequency lower than the circuit's maximum frequency. In some embodiments of the present invention, bias currents applied to analog and/or mixed signal circuits may be reduced when the analog and/or mixed signal circuit is producing signals of lower quality. Merely by way of example, a digital control unit may be used to scale the bias current or currents that may be applied to the analog or mixed signal circuits.

For purposes of this specification, an image sensor device may comprise of an image sensor array and certain related circuits for operating and producing an output image from the image sensor array. The image sensor may be a one-dimensional column or a two-dimensional array of pixels and the pixels on the two-dimensional array may be considered as rows and columns. Outputs from the pixels may be applied to various circuits and processed to produce an output signal from the image sensor device. In certain aspects, circuits associated with the image sensor array may provide for the amplification and analog to digital conversion of the signals produced by the pixels of the image sensor array. Embodiments of the present invention may be used with any type of image sensor, e.g., a charge coupled device ("CCD") or a complementary metal oxide semiconductor ("CMOS") image sensor.

For purposes of this written description of the present invention, the term "bias current" shall be given its ordinary meaning in the art and may refer to a current that is applied to an analog or mixed signal component to control the operating characteristics of the analog or mixed signal component. As persons of skill in the art can appreciate, for a given operation characteristic of an analog or mixed signal circuit, such as the frequency of operation of the transconductance operational amplifier or the signal quality deliverable from an analog to digital; converter, a bias current may be applied to the analog and or mixed signal device so that the component functions with the desired characteristics. Further, for the analog and/or mixed signal component to operate with the desired characteristics there is an associated minimum bias current that, in general, needs to be applied to the analog and/or mixed signal device. Application of a bias current lower than the minimum bias current may not enable the analog and/or mixed signal component to operate with the required operating characteristics in some cases. Further, application of a bias current greater than the minimum current may provide for the operation of the analog and/or mixed signal component in the desired manner, but may result in the unnecessary consumption of current.

As persons of skill in the art are can appreciate, power consumption is related to the current flowing on a device and the power consumption of a device, including an image sensor device, is related to and will increase as a function of the sum of the various bias currents applied to analog and/or mixed signal components in the image sensor device. As such, it is possible to reduce the power consumption of an image sensor device by reducing the magnitude of the bias current or bias currents applied to the various analog and mixed signal circuits in the image sensor device.

FIG. 1 is a flow diagram depicting an embodiment of a method of dynamically scaling bias current for analog and/or mixed signal circuits in an image sensor device. In step 110, a mode of operation of an image sensor device 100 is selected. As discussed above, an image sensor device may comprise and image sensor array and various circuits to process the image output from the image sensor array, including analog and/or mixed circuit signal circuits, such as amplifiers, comparators, analog-to-digital converters, and the like. In embodiments of the present invention, the mode of operation of the image sensor device 100 may refer to the resolution of the image to be produced by the image sensor device 100, the frame rate of a video image to be produced by the image sensor device 100, frequency of operation, or the like. Merely by way of example, in camera phones a user may often select from three or more modes of operation of the image sensor device (camera). In one embodiment, the user of a camera phone may select modes of operation of the image sensor device producing images of 640×480, 320×240, or 160×120 pixels in still image operation and 128×96 and 176×144 in video operation. Other resolutions to scale between are possible for other embodiments.

In certain embodiments of the present invention, the operation characteristics of analog and mixed signal circuits in the image sensor device 100 may be altered depending upon the mode of operation of the image sensor device 100 as a whole. Merely by way of example, when the image sensor device 100 is set to produce high resolution images, high resolution of high frame rate video images, or the like, the analog and mixed signal circuits of the image sensor device 100—such as comparators, amplifiers, ADCs, and the like—may be set to perform at a high end of their capabilities. As such, the bias currents to the analog and mixed signal circuits of the image sensor device 100 may be set to a high or maximum value to provide that the analog and/or mixed signal devices are producing the necessary operating characteristics, i.e., are operating at the correct frequency and/or are outputting the correct signal quality. Further, merely by way of example, when the image sensor device 100 is set to provide lower resolution images, lower frequency video, or the like, the analog and/or mixed signal circuits associated with the device—such as amplifiers, comparators, ADCs, and the like—may operate at a lower frequency and/or output a lower signal quality and, as a result, may use a lower bias current.

In step 120, biasing current requirements of analog and/or mixed signal devices associated with the image sensor device 100 may be processed according to the selected mode of operation of the image sensor device 100. In accordance with embodiments of the present invention, processing of bias current requirements may be performed by a microcontroller or state machine. Processing may involve determining the applicable bias currents to apply to the analog and/or mixed signal circuits in the image device so as to operate the image sensor device 100 in accordance with the selected mode. This processing may involve selecting a preprogrammed bias current to provide to the analog and/or mixed signal circuit in order to operate the analog an/or mixed signal circuit with the operating characteristics required by the selected mode of operation. Once the mode of operation of the image sensor device 100 has been determined, in step 130 the processor may output a digital output corresponding to a magnitude of the bias current to be applied to an analog and or mixed signal circuit in order for the analog or mixed signal circuit to operate in the manner required by the selected mode.

In certain embodiments, processing the bias current requirements for analog and/or mixed signal circuits associated with the image sensor device 100 may require processing the minimum bias current that may be applied to the analog and/or mixed signal circuits that will provide the operating characteristics from the analog and/or mixed signal circuits necessary for the selected mode of operation of the image sensor device. In this way, in certain aspects of the present invention, the bias current to be applied to one or more of the analog and/or mixed signal circuits may be controlled by the processor. In further aspects of the present invention, the digital output may be scaled up or down by the processor in accordance with the selected mode.

In an embodiment of the present invention, as depicted in step 140, the outputted digital signal may be communicated to a digital to analog converter. In some aspects of the present invention, the digital to analog converter may convert the digital output from the processor into an analog output. In certain aspects, the digital to analog converter may convert the digital output directly to a current that may be applied to the analog and/or mixed signal circuit. In accordance with an embodiment of the present invention, as depicted in step 150, the analog output from the analog to digital converter may be applied to the analog and/or mixed signal circuit.

In some embodiments, the analog output from the digital to analog converter may be a voltage. This voltage may be applied to a current controlling component, such as a transistor, to control the bias current flowing through the component, and the current flowing through the component may then be applied as a biasing current to the analog and/or mixed signal circuit. Merely by way of example, in certain aspects the analog output may be applied to a transistor to control a current flowing through the transistor and the current flowing through the transistor may be the bias current applied to the analog and/or mixed signal circuit.

Figure 2A:
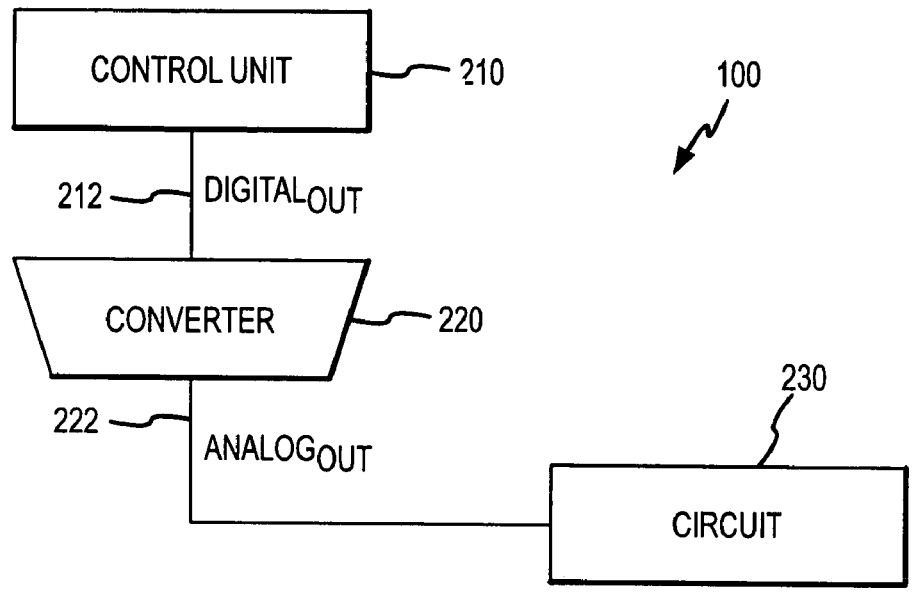
FIG. 2A is a simplified block diagram of an embodiment of direct bias current scaling for an analog and/or mixed signal circuit in an image sensing device.

FIG. 2A is a simplified block diagram of an embodiment of direct bias current scaling for an analog and/or mixed signal circuit in an image sensing device. In an embodiment of the present invention, a control unit 210 may control the operation of the analog and/or mixed signal circuits in the image sensor device 100. In certain aspects, the control unit 210 may be a microcontroller or state machine. In the illustrated embodiment of the present invention, when a mode of operation of the image sensor device 100 is selected—i.e., video or still image, resolution of image, and the like—the control unit 210 and or a software program associated with the control unit 210 may determine the bias current or bias currents to be applied to the analog and/or mixed signal circuits of the image sensor device 100. In certain embodiments, the control unit 210 may determine a minimum bias current or be preprogrammed with the bias current to provide to the analog and/or mixed signal circuits in order for the analog and/or mixed signal circuits to operate with the operating characteristics required by the selected mode of operation of the image sensor device 100. In certain embodiments, feedback may be provided to the control unit 210. Feedback may be provided from the output of the image sensor device 100, the output of the analog and/or mixed signal circuits, or the like. In certain aspects, the control unit may change the bias current to be applied to analog and/or mixed signal circuits based upon received feedback.

The bias current to provide to the analog and or mixed signal circuits may be the minimum bias current that will operate the analog and/or mixed signal circuit with the operating characteristics desired for operation of the image sensor device in the selected mode. Alternatively, an error factor may be built into the bias current to provide to the analog and/or mixed signal circuit to provide for such things as operational anomalies in the image sensor device, degradation in the circuits, noise, and the like. In an embodiment of the present invention, the control unit 210 may be preprogrammed with the bias currents to provide to the analog and/or digital circuits. As such, when a mode of operation is selected for the image sensor device 100, the control unit 210 may provide for the output of a digital output 212 corresponding to the preprogrammed bias current. In this way, the bias currents applied to the analog and/or digital circuits may be dynamically scaled in response to the changes in the mode of operation of the image sensor. In certain aspects, the value of the preprogrammed bias current to apply to a analog and/or mixed signal circuit may be determined from experimentation with the circuits, recording bias current requirements during operation of the image sensor device, manufacturer specifications, or the like.

The control unit 210 may output a digital output 212 corresponding to the bias current to be applied to the analog and/or mixed signal circuit corresponding to the selected mode of operation of the image sensor device 100, as processed by the control unit 210 or an associated software program. In certain embodiments, the control unit 210 may provide the digital output 212 to a digital to analog converter 220. In certain aspects the analog to digital converter 220 may be operated by a low-voltage direct current. In some embodiments of the present invention, the analog converter 220 may convert the digital output 212 from the control unit 210 to an analog output 222. In certain aspects, the analog to digital converter 220 may convert the digital output 212 directly to a current. Further, the analog output 222 may be passed through an amplifier in order to amplify the analog output.

In certain embodiments, the analog output 222 may be applied to a circuit 230. In an embodiment of the present invention, the analog output 222 may be the bias current and may be applied directly to the circuit 230 as a biasing current. In some embodiments, the circuit 230 may be an analog circuit. In other embodiments, the circuit 230 may be a mixed signal circuit. In other embodiments, circuit 230 may be a combination of an analog and mixed signal circuit. Further, in certain aspects circuit 230 may comprise a single analog or mixed signal component. In other aspects, circuit 230 may comprise a plurality of components with at least one analog or one mixed signal component. As persons of skill in the art can appreciate, all of the components of the image sensor device 100, including the bias current scaling components and digital processing, may be incorporated on a single chip, on the same substrate, or the like. However, in some embodiments of the present invention, components for dynamic current scaling may be external and in communication with the image sensor device 100.

Figure 2B:
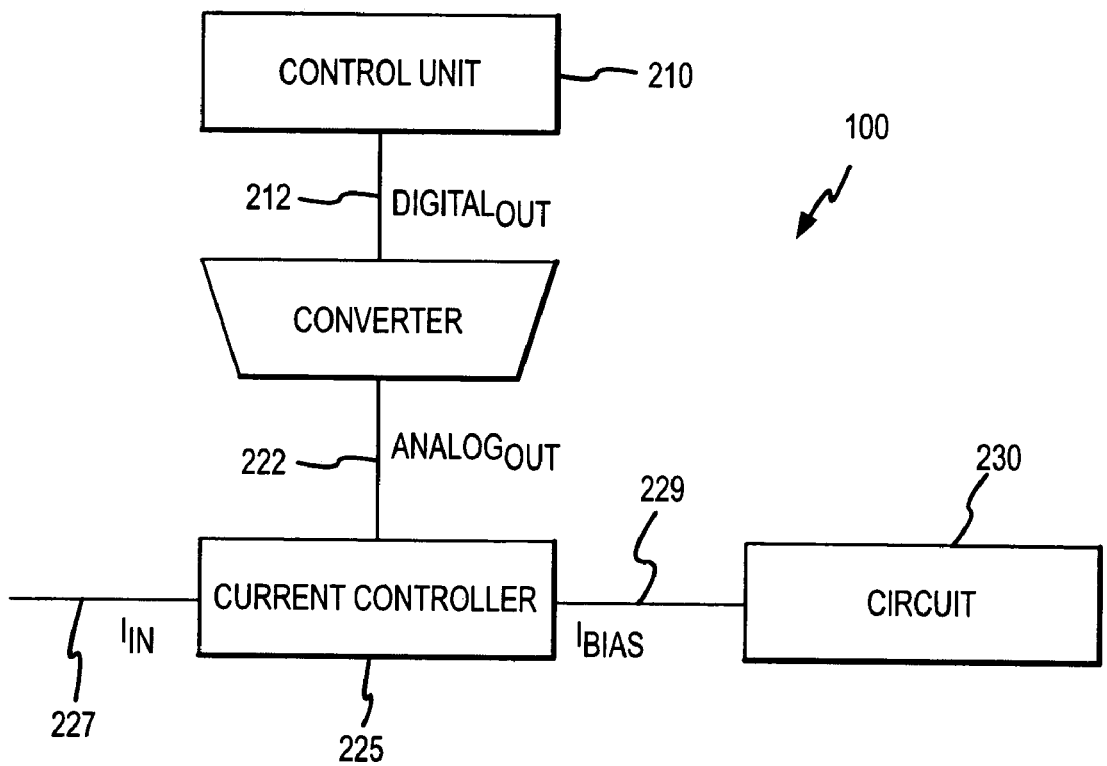
FIG. 2B is a simplified block diagram of an embodiment of indirect bias current scaling for an analog and/or mixed signal circuit in an image sensing device.

FIG. 2B is a simplified block diagram of an embodiment of indirect bias current scaling for an analog and/or mixed signal circuit in an image sensing device. In an embodiment of the present invention, the control unit 210 may provide the digital output 212 for scaling the bias current applied to an analog and/or mixed signal circuit 230 to the appropriate value for the selected mode of operation of the image sensor device 100 to the digital to analog converter 220. In an embodiment of the present invention, the digital to analog converter 220 may convert the digital output 212 to the analog output 222. In certain embodiments, the analog output 222 may be applied to a current controller 225. In certain aspects, the control device may be a transistor or the like that is able to control an input current $I_{IN}$ 227 so as to produce an output bias current $I_{BIAS}$ 229. In accordance with some embodiments of the present invention, the analog output 222 may be applied to the current controller 225 to scale the output bias current $I_{BIAS}$ 229 for application to the circuit 230. In this way, the control unit 210 may provide for scaling the output bias current $I_{BIAS}$ 229 to the required value for operation of the circuit 230 at the necessary frequency. In some aspects, the analog output 222 is a voltage that is applied to the current controller 225.

Merely by way of example, in certain embodiments of the present invention, a transconductance analog operational amplifier may be used in connection with the image sensor device 100, for among other things, amplifying the output from pixels on the sensor array prior to conversion of the pixel output from analog to digital form. In such embodiments, it may be necessary to apply a high bias current across the transconductance analog operational amplifier in modes of operation of the image sensor device 100 using the transconductance analog operational amplifier to operate at a high frequency, such as to produce high resolution video images. However, a lower bias current may be applied across the transconductance analog operational amplifier when the image sensor device 100 produces lower resolution video images. In certain embodiments of the present invention, the digital output 222 may be a voltage and this voltage may be applied as a voltage source to control P-channel transistors in the transconductance operational amplifier. In certain aspects, the P-channel transistors control the bias current flowing through the transconductance operational amplifier and, as such, the output voltage from the digital to analog converter may dynamically scale the bias current in the transconductance operational amplifier.

Figure 3:
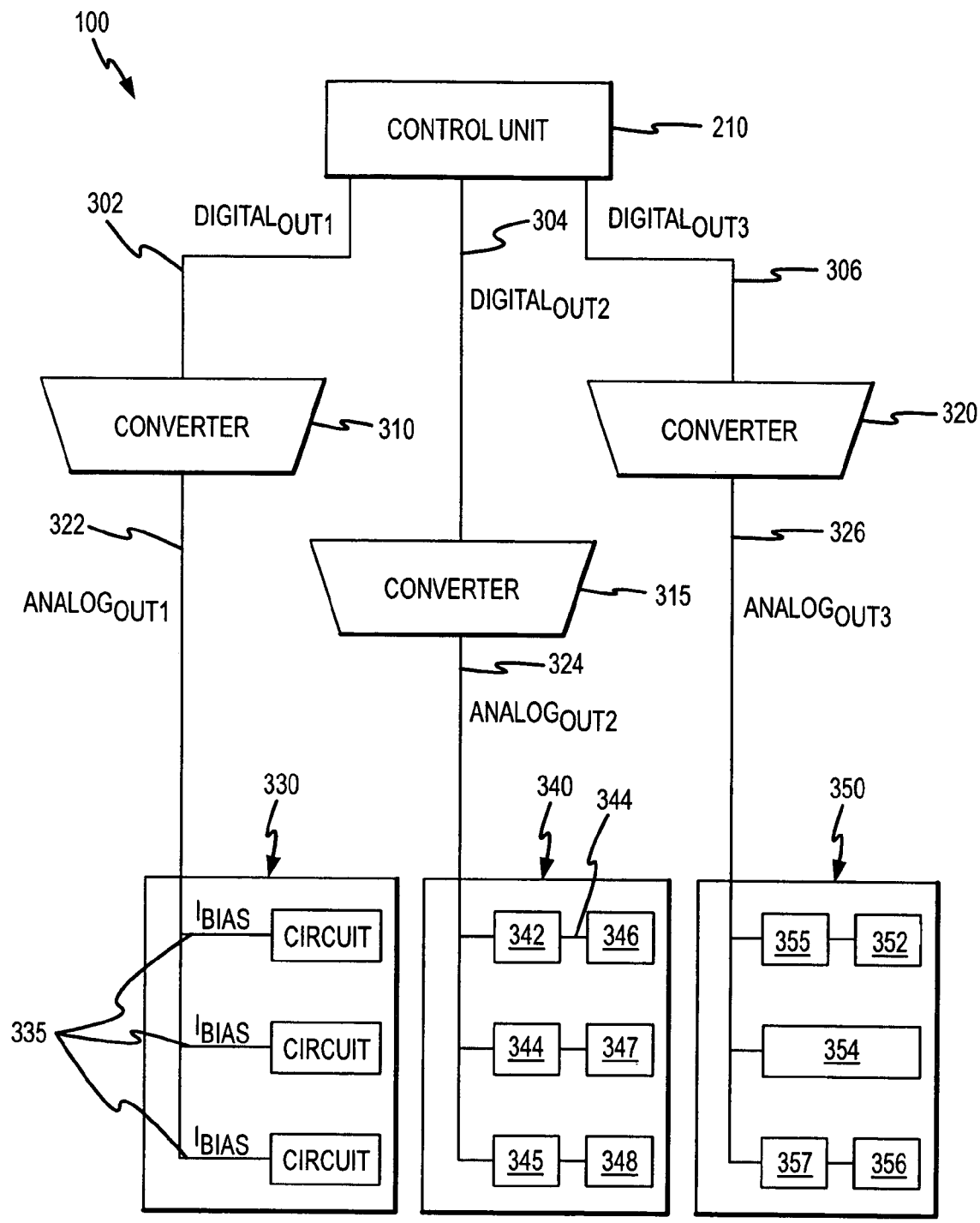
FIG. 3 is a simplified block diagram of an embodiment of bias current scaling of groups of analog and/or mixed signal devices in an image sensor device.

FIG. 3 is a simplified block diagram of an embodiments of bias current scaling of groups of analog and/or mixed signal devices in an image sensor device. The control unit 210 may process the bias current requirement of analog and/or mixed signal circuits in the image sensor device 100 for selected modes of operation of the image sensor device 100. In many embodiments, control unit 210 may be in communication with a plurality of analog and/or mixed signal circuits. In some embodiments of the present invention, when a mode of operation of the image sensor device 100 is selected, control unit 210 may output a plurality of digital outputs to control and dynamically scale the bias currents applied to the analog and/or mixed signal circuits on the image sensor device 100. Merely by way of example, FIG. 3 illustrates the control unit 210 outputting three digital outputs—digital$_{out1}$ 302, digital$_{out2}$ 304 and digital$_{out3}$ 306.

In certain embodiments, digital$_{out1}$ 302, digital$_{out2}$ 304 and digital$_{out3}$ 306 may be converted to analog outputs—analog$_{out1}$ 322, analog$_{out2}$ 324 and analog$_{out3}$ 336—by digital to analog converter 310, digital to analog converter 315 and digital to analog converter 320, respectively. In some embodiments of the present invention, analog and/or mixed signal circuits operating with common bias current requirements may be grouped together. Merely by way of example, FIG. 3 illustrates the control unit 210 in communication, via analog converter 310, analog converter 315 and analog converter 320, with three circuit groups—circuit group 330, circuit group 340 and circuit group 350. In some aspects, the circuit groups may comprise two or more analog and/or mixed signal circuits. Merely by way of example, as illustrated in FIG. 3, circuit group 330 comprises of circuits 332, 334 and 336. In certain aspects, the circuits 332, 334 and 336 may all be analog circuits, may all be mixed signal circuits or may be a combination of analog and mixed signal circuits. In some embodiments of the present invention, circuits 332, 334 and 336 may all have common bias current requirements for different operating modes of the image sensor device 100.

In certain embodiments of the present invention, analog$_{out1}$ 322 may be applied to the circuit group 330 comprising circuits 332, 334 and 336. A common bias current $I_{BIAS}$ 335 may be applied to the three circuits 332, 334 and 336 for proper operation of the circuits at the selected mode. In such aspects, as persons of skill in the art can appreciate, analog$_{out1}$ 322 may be a current with a value corresponding to a multiple of three times the value of $I_{BIAS}$ 335 so that each to provide that each of the three circuits receives a bias current equal to $I_{BIAS}$ 335.

In different embodiments, analog$_{out}$ 2314 may be applied to the circuits 332, 334 and 336 through a current controlling component 342. In certain aspects, analog$_{out}$ 2314 may be a voltage that may be applied to a current controller 342 and may provide a bias current $I_{BIAS}$ 344 to a circuit 346. In certain embodiments, circuit 346 may be an analog or mixed signal circuit. A circuit group 340 may comprise two or more circuits—for example, as illustrated in FIG. 3, circuits 346, 347 and 348—in communication with the current controllers 342, 343 and 345. In certain aspects, a common voltage may be applied to current controller 342, current controller 343, and current controller 345 to provide bias currents to circuit 346, circuit 347 and circuit 348, respectively. In certain aspects, the common voltage may provide for the scaling of the bias currents to the analog and/or mixed signal circuits for operation of these circuits at a frequency required by the selected mode of operation of the image sensor device 100.

As persons of skill in the art can appreciate, electrical components, such as resistors and transistors, may be added to a first circuit to provide that electrical characteristics of the first circuit match those of a second circuit with different components. In certain aspects, the electrical characteristics of a first circuit may be adjusted to match that of a second circuit receiving the same analog output from the same digital to analog converter to provide that the two circuits may be combined into a circuit group. In certain aspects, when electrical characteristics are appropriately matched, a circuit 352 receiving a bias current from a current controller 355 may be in a circuit group 350 with a circuit 354 that is driven by a bias current from a digital to analog converter 320. The bias currents provided to the circuits of blocks—332, 334, 335, 346, 347, 348, 352, 354, and 356—in accordance with an embodiment of the present invention, may be dynamically scaled to be just as much as the circuits need to operate at the frequency necessary for the image sensor device 100 to meet the requirements of the selected mode.

While the principles of the disclosure have been described above in connection with apparatuses and methods, it is to be clearly understood that this description is made way of example and not as limitation on the scope of the invention.

What is claimed is:

1. A method for managing current consumption of a circuit in a digital camera, the method comprising:
   providing a digital output corresponding to one of two or more modes of operation;
   receiving a signal identifying a first mode of operation of the digital camera;
   determining a first value for a bias current for application to the circuit, the first value of the bias current being sufficient to provide that the circuit functions with first operating characteristics required by the first mode of operation;

applying the first bias current to the circuit;
sensing a second mode of operation of the digital camera;
determining a second value for the bias current for application to the circuit, the second value of the bias current being sufficient to provide that the circuit functions with second operating characteristics required by the second mode of operation, and the first bias current is different to the second bias current; and
scaling the bias current from the first value to the second value;
applying the scaled bias current with the second value to the circuit when the circuit is operating at a frequency lower than a maximum frequency of the circuit or when the circuit is generating a signal of lower quality,
wherein the circuit has certain operating characteristics that may be varied by the application of different values of the biased current to the circuit, and
a minimum digital output provides the operating characteristics of the circuit conforming to the requirements of the corresponding mode of operation.

2. The method for managing current consumption of the circuit in the digital camera as recited in claim 1, wherein determining the first value for the bias current for application to the circuit includes determining a first minimum value for the bias current for the circuit to function with the first operating characteristics; and determining the second value for the bias current for application to the circuit includes determining a second minimum value for the bias current for the circuit to function with the second operating characteristics.

3. The method for managing current consumption of the circuit in the digital camera as recited in claim 1, wherein the circuit comprises a one of an analog circuit, a mixed signal circuit and a combination of an analog and a mixed signal circuit.

4. The method for managing current consumption of the circuit in the digital camera as recited in claim 1, wherein the digital camera includes a complementary metal oxide semiconductor camera.

5. The method for managing current consumption of the circuit in the digital camera as recited in claim 1, wherein the digital camera includes a charged-coupled device camera.

6. The method of claim 1, wherein scaling the bias current from the first value to the second value includes applying a voltage to a current controller to change the bias current flowing through the current controller from the first value to the second value.

7. A method for managing current consumption of a group of circuits in a digital camera, the method comprising:
providing a digital output corresponding to one of two or more modes of operation;
receiving a signal identifying one of two or more modes of operation of the digital camera, the mode of operation of the digital camera providing that each of the circuits in the group of circuits functions with certain operating characteristics;
determining a value for a bias current for applying to each of the circuits in the group of circuits to provide that each of the circuits in the group of circuits functions with the certain operating characteristics;
scaling the bias current to a combined value, the combined value being the value multiplied by an amount of circuits in the group of circuits;
applying the bias current to the group of circuits when the circuit is operating at a frequency lower than a maximum frequency of the circuit or when the circuit is generating a signal of lower quality,
wherein a minimum digital output provides the operating characteristics of the circuit conforming to the requirements of the corresponding mode of operation.

8. The method for managing current consumption of the group of circuits in the digital camera as recited in claim 7, wherein determining the value of the bias current to apply to each of the circuits in the group of circuits includes determining a minimum value for the bias current for each of the circuits in the group of circuits to function with the certain operating characteristics.

9. The method for managing current consumption of the group of circuits in the digital camera as recited in claim 7, wherein the group of circuits includes a plurality of analog circuits, and each of the analog circuits requires an equivalent bias current to function with the certain operating characteristics.

10. The method for managing current consumption of the group of circuits in the digital camera as recited in claim 7, wherein the group of circuits includes a plurality of mixed signal circuits, and each of the mixed signal circuits requires an equivalent bias current to function with the certain operating characteristics.

11. The method for managing current consumption of the group of circuits in the digital camera as recited in claim 7, wherein the group of circuits includes a plurality of analog and mixed signal circuits, and each of the analog and the mixed signal circuits requires an equivalent bias current to function with the certain operating characteristics.

12. The method for managing current consumption of the group of circuits in the digital camera as recited in claim 7, wherein the digital camera includes a complementary metal oxide semi-conductor camera.

13. The method for managing current consumption of the group of circuits in the digital camera as recited in claim 7, wherein the digital camera includes a charged-coupled device camera.

14. A system for dynamically scaling bias current, comprising:
an image sensor device capable of producing at least a two-dimensional image and capable of two or more modes of operation;
a control unit in communication with the image sensor device and configured to determine a digital output corresponding to a one of the two or more modes of operation and to output the digital output;
a converter in communication with the control unit and configured to convert the digital output from the control unit to a bias current;
a circuit in the image sensor device in communication with the converter and configured to receive the bias current and apply the bias current when the circuit is operating at a frequency lower than a maximum frequency or when the circuit is generating a signal of lower quality,
wherein the circuit has certain operating characteristics that may be varied by the application of different values of the bias current to the circuit, and
wherein the control unit outputs a minimum digital output to provide that the operating characteristics of the circuit conform to the requirements of the corresponding mode of operation.

15. The system for dynamically scaling bias current as recited in claim 14, wherein the image sensor device, the control unit, and the converter are all incorporated on a single chip.

16. The system for dynamically scaling bias current as recited in claim 14, wherein the control unit is preprogrammed with the digital outputs corresponding to the two or more modes of operation.

17. The system for dynamically scaling bias current as recited in claim 14, wherein the control unit processes operating data concerning the circuit to determine the digital outputs corresponding to the two or more modes of operation.

18. The system for dynamically scaling bias current as recited in claim 14, wherein the control unit is a microcontroller.

19. The system for dynamically scaling bias current as recited in claim 14, wherein the converter is a digital to analog converter.

20. The system for dynamically scaling bias current as recited in claim 14, wherein the circuit is a one of an analog circuit and a mixed signal circuit.

21. A system for dynamically scaling bias current, comprising:
an image sensor device capable of producing at least a two-dimensional image and capable of two or more modes of operation;
a control unit in communication with the image sensor device and configured to determine a digital output corresponding to a one of the two or more modes of operation and to output the digital output;
a converter in communication with the control unit and configured to convert the digital output from the control unit to an analog output;
a current controller in communication with the converter and the circuit and configured to receive the analog output from the converter, the analog output being a voltage, and the voltage being applied to the current controller to dynamically scale a bias current flowing through the current controller;
a circuit in the image sensor device in communication with the converter and configured to receive the scaled bias current and apply the scaled bias current when the circuit is operating at a frequency lower than a maximum frequency or when the circuit is generating a signal of lower quality, wherein the circuit has certain operating characteristics that may be varied by the application of different values of the bias current to the circuit,
wherein the control unit outputs a minimum digital output to provide that the operating characteristics of the circuit conform to the requirements of the corresponding mode of operation.

22. A system for dynamically scaling bias current, comprising:
an image sensor device capable of producing at least a two-dimensional image and capable of two or more modes of operation;
a group of circuits associated with the image sensor device, each circuit in the group of circuits having certain operating characteristics that may be varied by the application of different values of a bias current to the circuit;
a control processor in communication with the image sensor device and configured to provide a digital output corresponding to a one of the two or more modes of operation, the digital output corresponding to a value of the bias current necessary to operate each of the circuits in the group of circuits with the operating characteristics required by the mode of operation multiplied by an amount of the circuits in the group of circuits;
a converter in communication with the control processor and configured to convert the digital output to the bias current and to apply the bias current to the group of circuits when the circuit is operating at a frequency lower than a maximum frequency of the circuit or when the circuit is generating a signal of lower quality,
wherein the bias current value includes a minimum value for each of the circuits in the group of circuits to operate with the operation characteristics required by the mode of operation.

23. The system for dynamically scaling bias current as recited in claim 22, wherein the image sensor device, the control processor, the converter are all incorporated on a single chip.

24. The system for dynamically scaling bias current as recited in claim 22, wherein the control unit is a microcontroller.

25. The system for dynamically scaling bias current as recited in claim 22, wherein the converter is a digital to analog converter.

26. The system for dynamically scaling bias current as recited in claim 22, wherein the group of circuits include a plurality of analog circuits each of the analog circuits being operated by an equivalent bias current.

27. The system for dynamically scaling bias current as recited in claim 22, wherein the group of circuits includes a plurality of mixed signal circuits, each of the mixed signal circuits being operated by an equivalent bias current.

28. The system for dynamically scaling bias current as recited in claim 22, wherein the group of circuits includes a plurality of analog circuits and mixed signal circuits, each of the analog and the mixed signal circuits being operated by an equivalent bias current.

* * * * *